April 2, 1963  B. J. HEYM  3,084,009
VIBRATION ISOLATION SUSPENSION SYSTEM
Filed May 9, 1961  2 Sheets-Sheet 1

INVENTOR
Bernhard J. Heym
BY Bonet & Bonet
ATTORNEYS

April 2, 1963    B. J. HEYM    3,084,009
VIBRATION ISOLATION SUSPENSION SYSTEM
Filed May 9, 1961    2 Sheets-Sheet 2
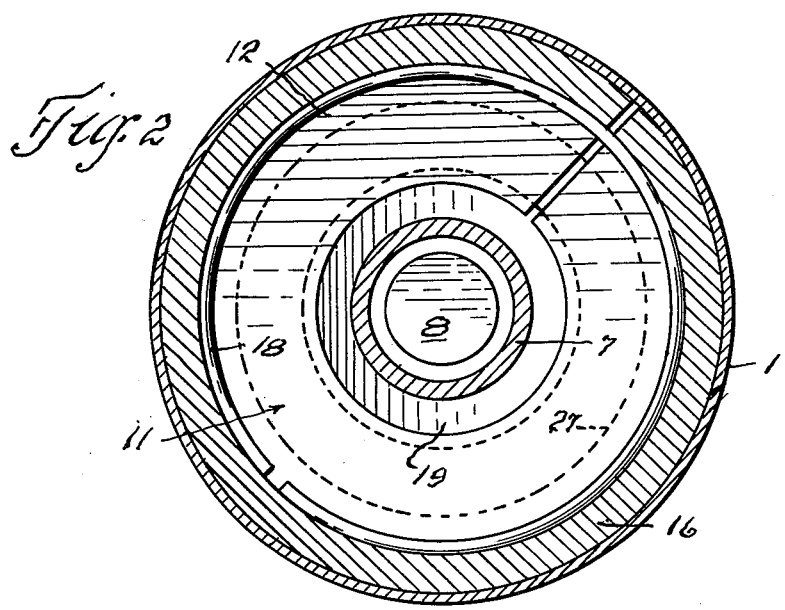
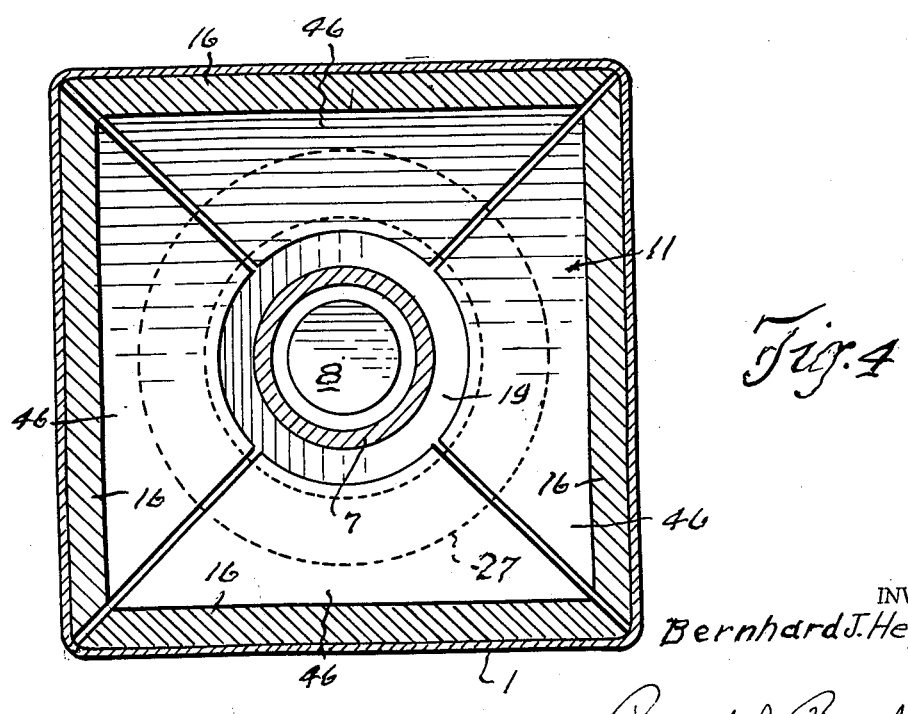
INVENTOR
Bernhard J. Heym
BY
ATTORNEYS United States Patent Office 3,084,009
Patented Apr. 2, 1963

3,084,009
VIBRATION ISOLATION SUSPENSION SYSTEM
Bernhard J. Heym, Huntington, N.Y., assignor to Sperry Rand Corporation, Ford Instrument Company Division, Wilmington, Del., a corporation of Delaware
Filed May 9, 1961, Ser. No. 108,826
16 Claims. (Cl. 312—352)

This invention relates to a vibration isolation and suspension mechanism which is particularly adapted for use with light weight units, and especially gyro-like devices.

The mechanism comprises generally a cylindrical casing which is adapted to be secured in fixed position on a vehicle or other carrying member which is subject to rapid accelerations and/or vibrations. A cage, in which a unit is adapted to be mounted, is centrally disposed within the casing between upper and lower conical load springs. A nylon split damping ring, which is T-shaped in cross section, is slidably mounted within the casing between upper and lower snubbers. The outer surface of the vertical section of the damping ring is spring pressed into engagement with the inner surface of the casing by a spring snap ring. The cage is provided with a medial annular groove for the reception of the horizontal section of the damping ring. The groove is of such a depth that the cage may move laterally in all directions upon the horizontal section of the damping ring. The cage is also provided with a pair of spaced annular flanges, one on each side of the annular groove. A ring shaped corrugated lateral damping spring is disposed between the upper surface of the horizontal section of the damping ring and the under surface of the upper flange.

Any vertical movement of the cage loads the conical springs and provides damping by dry sliding friction due to the displacement of the damping ring with respect to the casing. Any lateral displacement of the cage with respect to the damping ring distorts and loads the conical springs, and the lateral damping spring provides damping in a horizontal plane by dry sliding friction. Rotation of the cage about its axis is restrained by the upper conical load spring which has one end thereof anchored to the casing and the other end thereof anchored to the cage.

The principal object of the invention is to provide a vibration isolation and damping mechanism having center-of-gravity type suspension that reduces rocking modes of vibration imparted to a suspended unit and more accurately maintains the initial unexcited spatial relationship thereof with respect to a reference surface.

Another object of the invention is to provide an isolation and damping device which provides low frequency damping in any direction of vibration, and effectively isolates high frequency vibration.

Another object of the invention is to provide a device of the aforesaid character having increased life and dependability in shock type loading, and which can be more economically manufactured in that less precision is required in fabrication.

Still another object of the invention is to provide a device of the aforesaid character which is of compact construction and provides excellent environmental protection for a suspended unit.

Having stated the principal objects of the invention other and more limited objects thereof will be apparent from the following specification and the accompanying drawings forming a part thereof in which:

FIG. 2 is a horizontal section taken substantially on the line 2—2 of FIG. 1;

FIG. 4 is a view similar to FIG. 2 showing a slightly modified form of the invention.

Figure 1:
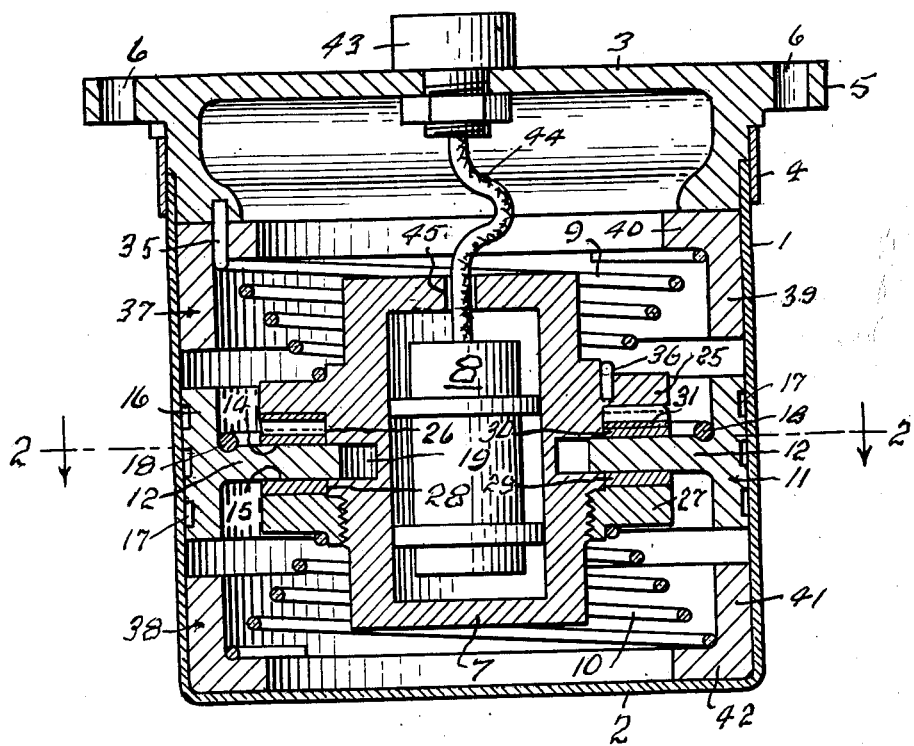
FIG. 1 is a central vertical section through a vibration isolation suspension mechanism embodying my invention.
Figure 3:
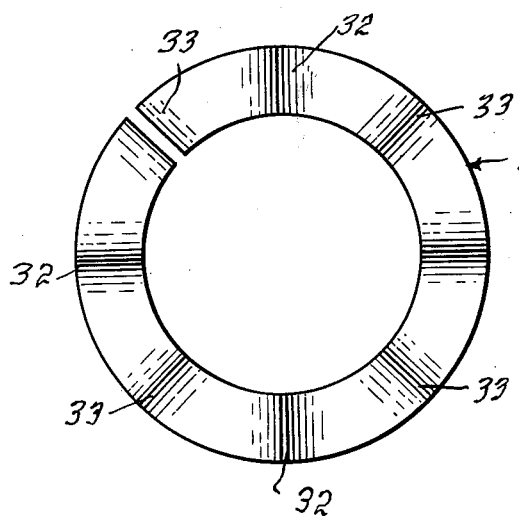
FIG. 3 is a detail plan view of the corrugated lateral damping spring.

Referring now to the drawings by reference characters the numeral 1 indicates a cylindrical sheet metal casing which is permanently closed at the lower end thereof by an integral bottom wall 2. The upper end of the casing 1 is closed by a removable cap 3 which is secured to the casing by a sealing tab or ring 4. The cap 3 is provided with an annular flange 5 having a plurality of vertical bores 6 by means of which the mechanism is adapted to be secured to a carrying member.

A cage 7, in which a unit 8 is adapted to be supported, is mounted within the casing 1 between a pair of upper and lower conical load springs 9 and 10 respectively. The springs 9 and 10, which have equal stiffness rates in all directions, resiliently support the cage 7 for vertical up and down movement and for lateral movement in all directions. The cage 7 is normally centrally disposed within the casing 1 with the vertical axis thereof coincident with the vertical axis of the casing 1, but disturbing forces, such as acceleration forces, applied to the mechanism will cause displacement of the cage 7 out of normal position which will distort and load the conical load springs 9 and 10 so that they will return the cage to normal position when the disturbing force is removed.

In order to dampen the movement of the cage 7, due to disturbing forces, a split damping ring 11 is provided. The damping ring 11, which is preferably made of nylon, comprises a horizontally disposed annular section 12 having flat smooth parallel upper and lower surfaces 14 and 15, respectively, and an integral vertically disposed annular section 16 which extends above and below the horizontal section 12 about the outer periphery thereof. The outer surface of the vertical section 16, which is provided with a plurality of shallow grooves 17, is spring pressed into engagement with the inner surface of the casing 1 by a vertical damping spring in the form of spring snap ring 18.

The cage 7 is provided with a medial annular groove 19 about the outer periphery thereof for the reception of a portion of the horizontal section 12 about the inner periphery thereof. The width of the groove 19 is slightly greater than the thickness of the damping ring section 12 to provide a freely sliding fit between the groove 19 and the section 12; and the diameter of the base of the groove 19 with respect to the diameter of the inner periphery of the horizontal section 12 of the damping ring 11 is such that the cage 7 may float a limited amount in any direction horizontally upon the horizontal section 12 of the damping ring 11.

The cage 7 is provided with an integral annular flange 25 which is disposed above the groove 19 to provide an annular space 26 about the cage 7 between the upper surface of the damping ring section 12 and the under surface of the flange 25. The cage 7 is also provided with an annular flange 27 which is threaded onto the cage 7 below the groove 19 with the upper surface thereof spaced a short distance below the under surface of the damping ring section 12 to provide an annular space 28 about the cage 7 between the under surface of the section 12 and the upper surface of the flange 27. A thin metal ring 29 is disposed in the annular space 28 in contact with the top of the flange 27 and the bottom of the damping ring section 12, and a ring 30, similar to the ring 29, is disposed in the annular space 26 with the under surface thereof in contact with the upper surface of the damping ring section 12. A ring-shaped corrugated lateral damping spring 31 having alternate hill and dale sections 32 and 33, respectively, is also disposed in the annular space 26 between the top of the ring 29 and the bottom of the flange 25 with the hill sections 32 thereof in engagement with the under surface of the flange 25, and the dale sections 33 thereof in engagement with the upper surface of the ring 30. The cage 7 is thereby resiliently clamped to the horizontal section 12 of the damping ring 11.

Any movement of the cage 7 in a vertical direction will carry the damping ring 11 with it which will provide vertical damping by the dry sliding friction between the outer peripheral surface of the vertical section 16 of the damping ring 11 and the inner wall of the casing 1. Any movement of the cage 7 in any direction in a horizontal plane will displace the cage with respect to the damping ring 11, which will distort and load the conical load springs 9 and 10, and provide lateral damping by the dry sliding friction between the horizontal section 12 of the damping ring 11 and the flange 25 and flange 27 of the cage 7. It will therefore be seen that vibration isolation by the use of conical load springs and dry sliding friction is successfully utilized to provide friction damping in all vertical and lateral directions.

Rotation of the cage 7 about the axis of the casing 1 is restrained by the upper conical load spring which has the end of the uppermost coil thereof anchored to the cap 3 as indicated at 35, and the end of the lowermost coil thereof anchored to the cage 7 as indicated at 36.

In order to yieldingly stop and limit the vertical movement of the damping ring 11, and consequently the cage 7, in either direction, a pair of opposed upper and lower ring-shaped snubbers 37 and 38 which are made of any suitable compressible or displaceable material are provided. The upper snubber 37 which comprises a vertical section 39 and an inwardly extending horizontal section 40 at the upper end thereof is mounted in fixed position above the damping ring in the casing 1 with outer surface of the vertical section 39 in contact with the inner surface of the casing 1 with the lower end thereof slightly spaced from the upper end of the vertical section 16 of the damping ring 11, and the upper surface of the horizontal section in contact with the inner end of the cap 3. The uppermost coil of the upper conical load spring 9 is utilized to maintain the snubber 37 in this position.

The lower snubber 38 which comprises a vertical section 41 and an inwardly extending horizontal section 42 at the lower end thereof is mounted in fixed position below the damping ring in the casing 1 with the outer surface of the vertical section 41 in contact with the inner wall of the casing 1 and with the upper end thereof slightly spaced from the lower end of the vertical section 16 of the damping ring 11, and the lower surface of the horizontal section 42 thereof in contact with the inner surface of the bottom wall 2 of the casing 1. The lowermost coil of the lower conical load spring 10 is utilized in maintaining the snubber 38 in this position.

Electrical connection to the unit 8 within the cage 7 is made through a plug in socket 43 carried by the cap 3 and conductors 44 which enter the cage 7 through an aperture 45 in the upper end thereof.

In FIG. 4 I have shown a slightly modified form of the invention in which the tubular container 1 is made square in cross section and the outer periphery of the damping ring 11 is made to conform thereto in order to eliminate any tendency of the damping ring 11 to shift radially with respect to the container 1. In this form of the invention the damping ring 11 may be a single split ring, as shown in FIGS. 1 and 2, or it may be made in four similar separate quadrants 46 as shown in FIG. 4.

From the foregoing it will be apparent to those skilled in this art that I have provided a very simple and efficient mechanism for accomplishing the objects of the invention.

It is to be understood that I am not limited to the specific construction of the invention as shown and described herein as various modifications may be made therein within the spirit of the invention and the scope of the appended claims.

What is claimed is:

1. A suspension mechanism of the character described comprising a tubular casing, a cage disposed entirely within said casing, being non-contiguous therewith and adapted to support a unit, a pair of opposed similar vertically spaced conical load springs by and between which said cage is resiliently supported in said casing for vertical and lateral movement in all directions, a horizontally disposed damping ring mounted in said casing intermediate said load springs for vertical up and down movement in unison with said cage, vertical damping spring means by which the outer periphery of said damping ring is spring pressed into engagement with the inner wall of said casing, interengaging means between said cage and said damping ring by which said cage is mounted within the inner periphery of said damping ring for lateral movement in all directions with respect thereto, and lateral damping spring means by which said cage is spring pressed into engagement with said damping ring.

2. A suspension mechanism as defined by claim 1 in which said damping ring comprises a horizontally disposed section, and a vertically disposed section which extends above and below said horizontally disposed section about the outer periphery thereof.

3. A suspension mechanism as defined by claim 2 in which a pair of opposed snubbing members are mounted in fixed position in said casing, one above and one below said damping ring, in position to yieldingly stop and limit the vertcal movement of said damping ring and said cage in either direction.

4. A suspension mechanism as defined by claim 1 in which a pair of opposed snubbing members are mounted in fixed position in said casing, one above and one below said damping ring, in position to yieldingly stop and limit the vertical movement of said damping ring and said cage in either direction.

5. A suspension mechanism of the character described comprising a tubular casing, a cage disposed entirely within said casing, being non-contiguous therewith and adapted to support a unit, a pair of opposed similar vertically spaced conical load springs by and between which said cage is resiliently supported in said casing for vertical and lateral movement in all directions, a horizontally disposed damping ring mounted in said casing intermediate said load springs for vertical up and down movement in unison with said cage, vertical damping spring means by which the outer periphery of said damping ring is spring pressed into engagement with the inner wall of said casing, said cage having a medial annular groove about the outer periphery thereof by which said cage is mounted within the inner periphery of said damping ring for lateral movement in all directions with respect thereto, and lateral damping spring means by which said cage is spring pressed into engagement with said damping ring.

6. A suspension mechanism of the character described comprising a tubular casing, a cage disposed entirely within said casing, being non-contiguous therewith and adapted to support a unit, a pair of opposed similar vertically spaced conical load springs by and between which said cage is resiliently supported in said casing for vertical and lateral movement in all directions, a horizontally disposed damping ring mounted in said casing intermediate said load springs for vertical up and down movement in unison with said cage, vertical damping spring means by which the outer periphery of said damping ring is spring pressed into engagement with the inner wall of said casing, said cage having a medial annular groove about the outer periphery thereof by which said cage is mounted within the inner periphery of said damping ring for lateral movement in all directions with respect thereto, an annular flange about the outer periphery of said cage in spaced relation above said groove, and lateral spring damping means disposed about said cage between the upper surface of said damping ring and the under surface of said flange by which said cage is spring pressed into engagement with said damping ring.

7. A suspension mechanism of the character described comprising a tubular casing, a cage disposed entirely within said casing, being non-contiguous therewith and adapted to support a unit, a pair of opposed similar vertically spaced conical load springs by and between which said cage is resiliently supported in said casing for vertical and lateral movement in all directions, a horizontally disposed damping ring mounted in said casing intermediate said load springs for vertical up and down movement in unison with said cage, vertical damping spring means by which the outer periphery of said damping ring is spring pressed into engagement with the inner wall of said casing, said cage having a medial annular groove about the outer periphery thereof by which said cage is mounted within the inner periphery of said damping ring for lateral movement in all directions with respect thereto, a pair of vertically spaced annular flanges disposed about the outer periphery of said cage, one above and one below said annular groove, and lateral damping spring means disposed about said cage between one of said flanges and the opposing surface of said damping ring by which said damping ring is resiliently clamped to said cage between said annular flanges.

8. A suspension mechanism as defined by claim 5 in which said damping ring comprises a horizontally disposed section, and a vertically disposed section which extends above and below said horizontally disposed section about the outer periphery thereof.

9. A suspension mechanism as defined by claim 8 in which a pair of opposed snubbing members are mounted in fixed position in said casing, one above and one below said damping ring, in position to yieldingly stop and limit the vertical movement of said damping ring and said cage in either direction.

10. A suspension mechanism as defined by claim 6 in which said damping ring comprises a horizontally disposed section, and a vertically disposed section which extends above and below said horizontally disposed section about the outer periphery thereof.

11. A suspension mechanism as defined by claim 10 in which a pair of opposed snubbing members are mounted in fixed position in said casing, one above and one below said damping ring, in position to yieldingly stop and limit the vertical movement of said damping ring and said cage in either direction.

12. A suspension mechanism as defined by claim 7 in which said damping ring comprises a horizontally disposed section, and a vertically disposed section which extends above and below said horizontally disposed section about the outer periphery thereof.

13. A suspension mechanism as defined by claim 12 in which a pair of opposed snubbing members are mounted in fixed position in said casing, one above and one below said damping ring, in position to yieldingly stop and limit the vertical movement of said damping ring and said cage in either direction.

14. A suspension mechanism as defined by claim 1 in which the interengaging means comprise a pair of vertically spaced annular flanges disposed about the outer periphery of said cage, and in which said lateral damping spring means is disposed about said cage between one of said flanges and the opposing surface of said damping ring.

15. A suspension mechanism as defined by claim 14 in which said damping ring comprises a horizontally disposed section, and a vertically disposed section which extends above and below said horizontally disposed section about the outer periphery thereof.

16. A suspension mechanism as defined by claim 15 in which a pair of opposed snubbing members are mounted in fixed position in said casing, one above and one below said damping ring, in position to yieldingly stop and limit the vertical movement of said damping ring and said cage in either direction.

References Cited in the file of this patent
UNITED STATES PATENTS

| | | |
|---|---|---|
| 2,982,510 | Curriston | May 2, 1961 |

FOREIGN PATENTS

| | | |
|---|---|---|
| 117,883 | U.S.S.R. | July 2, 1959 |